Figure 1:
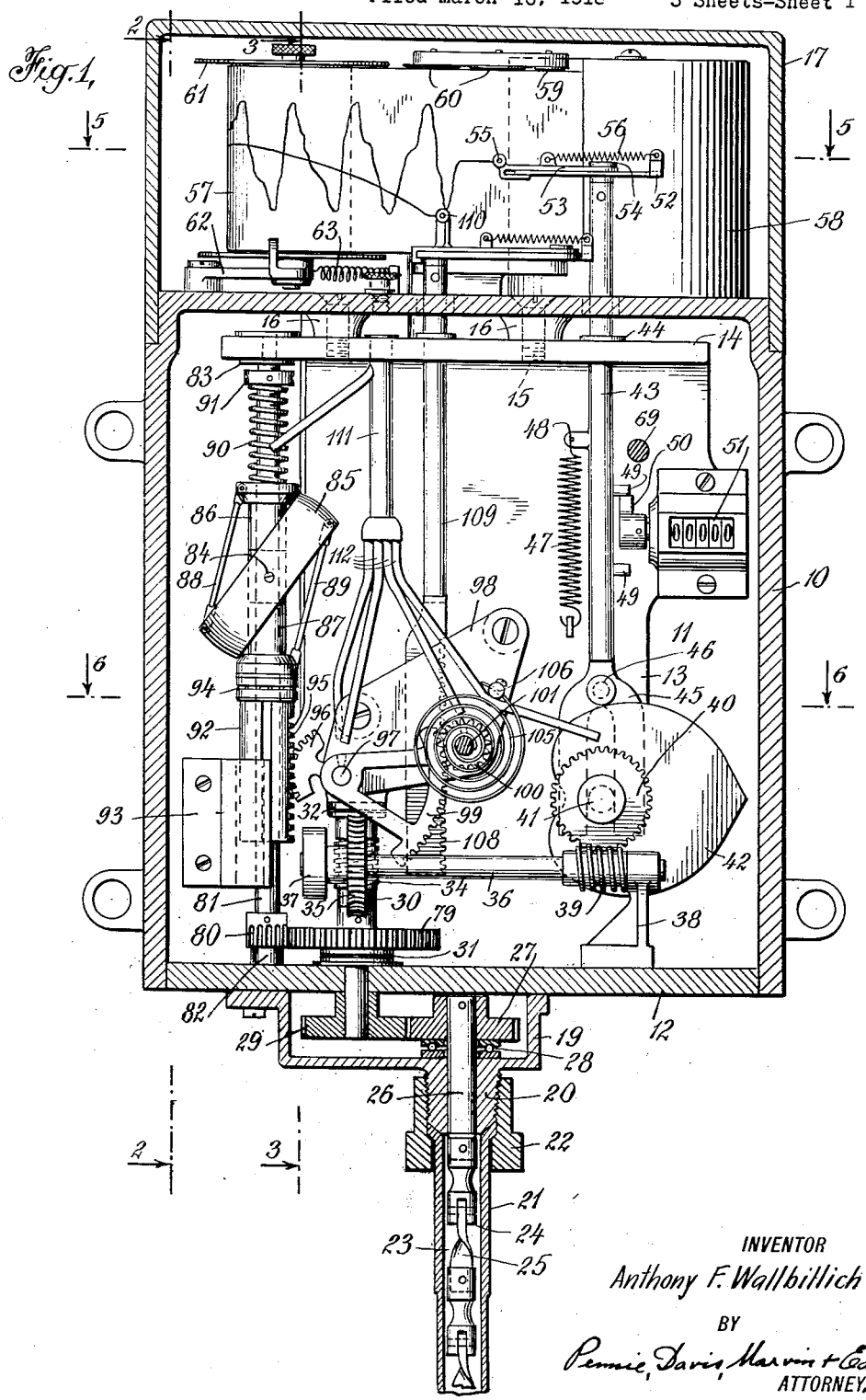

July 29, 1924.

A. F. WALLBILLICH 1,503,078

SPEED INDICATOR AND RECORDER

Filed March 16, 1918   3 Sheets—Sheet 1

INVENTOR
Anthony F. Wallbillich
BY
Pennie, Davis, Marvin + Edmonds
ATTORNEYS

July 29, 1924.
A. F. WALLBILLICH
SPEED INDICATOR AND RECORDER
Filed March 16, 1918    3 Sheets-Sheet 2
1,503,078
Fig. 2,
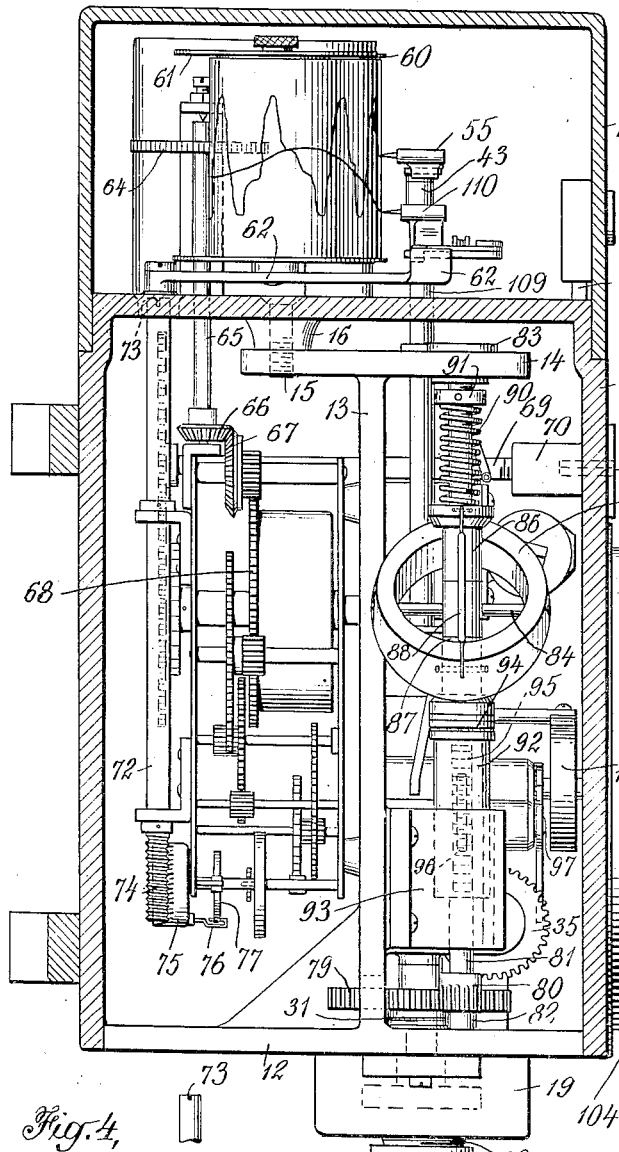
Fig. 3,
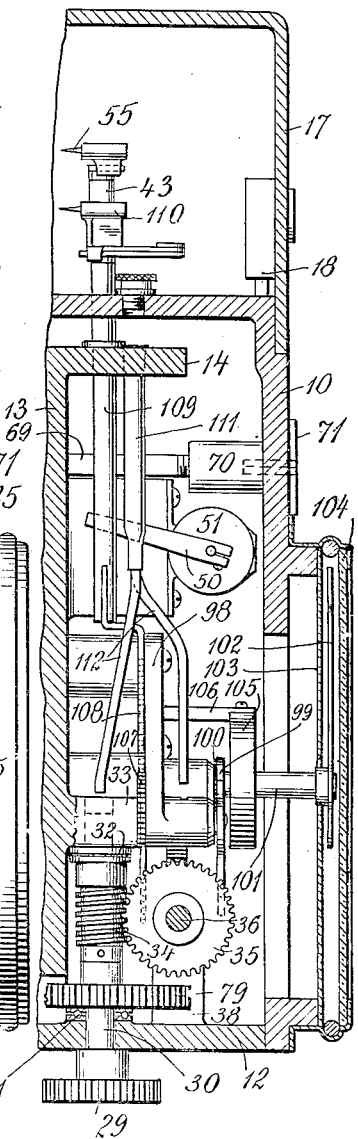
Fig. 4,
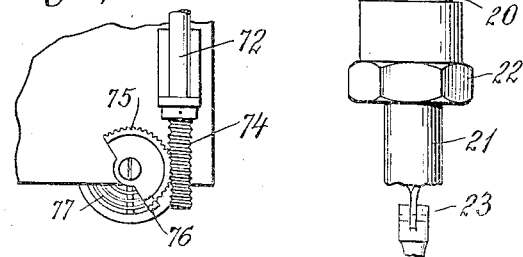
INVENTOR
Anthony F. Wallbillich
BY
Pennie, Davis, Marvin & Edmonds
ATTORNEYS

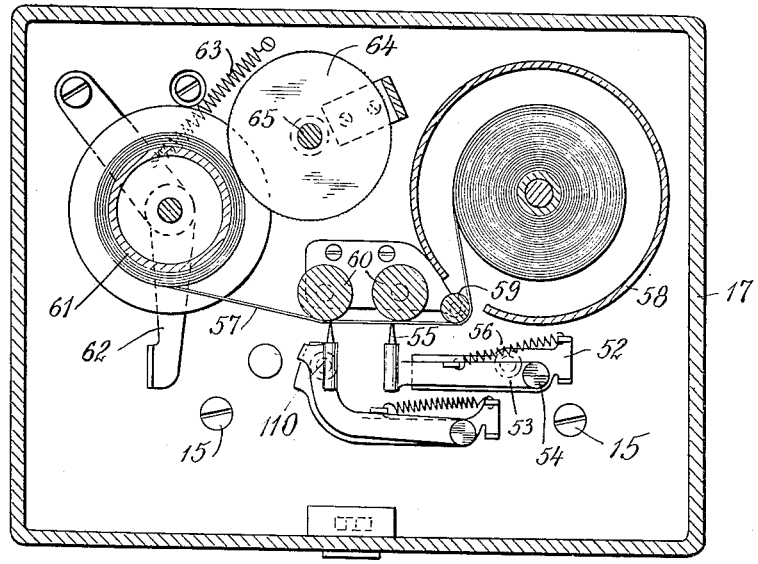

Patented July 29, 1924.

1,503,078

UNITED STATES PATENT OFFICE.

ANTHONY F. WALLBILLICH, OF NEWARK, NEW JERSEY, ASSIGNOR, BY MESNE ASSIGNMENTS, TO DISTANCE SPEED RECORDING COMPANY, OF NEW YORK, N. Y., A CORPORATION OF DELAWARE.

SPEED INDICATOR AND RECORDER.

Application filed March 16, 1918. Serial No. 222,847.

*To all whom it may concern:*

Be it known that I, ANTHONY F. WALLBILLICH, a citizen of the United States, residing at Newark, in the county of Essex, State of New Jersey, have invented certain new and useful Improvements in Speed Indicators and Recorders; and I do hereby declare the following to be a full, clear, and exact description of the invention, such as will enable others skilled in the art to which it appertains to make and use the same.

The present invention relates to instruments for use in indicating and recording the distance and speed of travel of a vehicle, such as a locomotive or an automobile.

More particularly, the invention relates to improvements in instruments of this character which are provided with a shaft adapted to be driven by a wheel of the vehicle, and this shaft through a reciprocating rod causes a marker to move over a tape driven by clock mechanism, with the result that there is traced upon the tape a curve in the form of a series of waves, the shape of which is indicative of the speed of travel of the vehicle at all times throughout the period of use of the instrument. The reciprocating rod also actuates a counter to register the total distance travelled by the vehicle. In addition to the above named parts, the instrument is provided with a centrifugal speed indicator actuated by the shaft driven from the wheel of the vehicle and operating an index adapted to move over a suitable scale. The centrifugal member also operates a second recording device which makes a record upon the tape corresponding to the indications of the index, and thus gives an exact record of what was seen, or should have been seen, by the engineer of the locomotive, or the operator of the vehicle. The record of speed made by the second marker is more direct in its readings than is the record made by the first marker, and while it may serve to check the latter it is independent of the same to the extent that its accuracy is not dependent upon the accuracy of the clock mechanism that drives the tape.

It is an object of the present invention to simplify and otherwise improve the construction of instruments of this general character in order that their cost of manufacture may be reduced, and their reliability and accuracy may be increased. Among the improvements embraced by the present invention is the provision of a more direct connection between the index of the centrifugal speed device and its recording marker thereby more effectively eliminating the chance of discrepancy between the indications of the index and the record on the tape. The driving connection between a moving part of the vehicle and the recording instrument has been simplified, as has also the driving connection between the centrifugal device and its index. In addition the construction of the centrifugal device has been improved.

Various other improvements and advantages of the present construction will appear more clearly from a disclosure of preferred embodiments of the various features of the invention as illustrated in the accompanying drawings in which, Fig. 1 is a front view of the interior of the instrument; Fig. 2 is a side view of the interior, the casing being in section along the line 2—2 of Fig. 1; Fig. 3 is a view of a portion of the interior along the line 3—3 of Fig. 1; Fig. 4 shows a detail of the clock mechanism; Fig. 5 is a horizontal section along the line 5—5 of Fig. 1; Fig. 6 is a similar section along the line 6—6 of Fig. 1, and Fig. 7 shows the exterior of the front of the instrument.

Referring to the drawings in which similar reference characters denote similar parts throughout the several figures, 10 is a rectangular casing within which is mounted a support 11 for the apparatus enclosed in the casing. The support is provided with a base portion 12 forming the bottom of the casing and an integral vertical portion 13 having a horizontal shelf 14 at its upper end. The support is fastened within the casing by screws 15 passing through bosses 16 formed on the inside of the top of the casing. It is intended that the recording apparatus mounted on top of the casing shall be enclosed by a cover 17 sealed, or locked, as at 18 against unauthorized removal, so that access to the support and the parts of the instrument mounted thereon cannot be obtained without first removing the cover 17 to reach the heads of the screws 15 to loosen them.

Attached to the base 12 of the support is a housing 19 provided with a depending portion 20, to the lower end of which is attached a protecting sleeve 21 by means of a union 22. The sleeve may be of any desired length and serves to enclose a flexible shaft 23 leading to any suitable part of the vehicle from which it may be driven in any convenient manner. While the shaft may be of any preferred construction, it is here shown as composed of links 24 having enlarged ends to which are pivoted other links 25 having their ends twisted at right angles to each other. The upper end of shaft 23 is attached to a shaft 26, passing through the depending portion 20 of the housing, and carrying at its upper end a gear 27, the weight of the gear, shafts 26 and 23 being carried upon a ball bearing 28 within the housing 19. Gear 27 meshes with a gear 29 on the lower end of a main driving shaft 30, extending through the base 12 of the support and provided with ball bearings 31 and 32 at its lower and upper ends, the upper bearing being mounted in a projection 33 extending from the front of the support 11. The shaft 30 is provided with a worm 34 which meshes with a pinion 35 on a shaft 36 supported in a bearing 37 projecting from the front of the support 11 and a bearing bracket 38 attached to the base portion of the support. A worm 39 on shaft 36 engages a pinion 40 on a stub-shaft 41 projecting from the front of support 11, and a heart-shaped cam 42 is attached to and is movable with the pinion 40. This cam is adapted to actuate a reciprocating rod 43 mounted in a bearing 44 in the shelf portion 14 of the support, and at its lower end formed with a forked portion 45 which slides upon the stub-shaft 41, between the cam 42 and a projection of the support 11 to which the stub-shaft is attached. A roller 46 mounted upon the rod engages the edge of the cam, and is held against the same by a spring 47 having one end attached to a projection from the front of support 11, and its other end attached to the rod 43 as at 48. Pins 49 project from the rod 43 on opposite sides of the operating arm 50 of a counter 51, so that as the rod 43 is moved up and down, the pins operate the counter once for each reciprocatory movement of the rod, that is, once for each revolution of the cam 42.

The upper end of rod 43 extends through an opening in the top of the casing, and carries at its top a marker, the construction of which appears most clearly in Fig. 5. This marker comprises an arm 52 provided with a stud adapted to be fitted into a socket on the end of the rod 43. A movable arm 53 is pivoted to the arm 52 as at 54 and upon the outer end of the movable arm is a socket for the reception of a marking pencil 55. A spring 56 attached to the movable arm and to the fixed arm holds the pencil against a tape 57 which is supplied from a receptacle 58 and passes over a roller 59, and then over a pair of rollers 60 to a winding drum 61 which is carried by an arm 62 pivotally mounted upon the top of the casing 10 and adapted to be turned on its pivot by a coiled spring 63. This spring draws the paper roll against the periphery of a knurled disk 64 mounted upon the upper end of a shaft 65 which passes through a bearing on the top of the casing 10 and down into the casing where at its lower end it carries a bevel gear 66 engaging a crown gear 67 carried by one of the shafts of a clock mechanism 68 secured to the rear face of the upright portion 13 of the support. This clock mechanism may be of any suitable construction and will not be described in detail except to explain that it is provided with a winding shaft 69 which extends to the front of the casing, where it is provided with an enlarged nut 70 having a square socket as at 71 within which a winding key may be inserted. For the purpose of regulating the clock without removing the apparatus from the casing 10 a shaft 72 mounted in bearings upon the frame of the clock extends through the top of the casing and is provided with a recess, as at 73, within which a key or screw driver may be inserted to turn the rod.

As shown most clearly in Figs. 2 and 4, the lower end of the rod 72 is provided with a worm 74 which meshes with a semicircular pinion 75 provided with a projection 76 to which is attached one end of the small balance spring 77 of the clock mechanism. By manipulating the rod 72 the tension of the balance spring may be altered to regulate the speed of the clock.

Upon the main shaft 30 is mounted a gear 79 which meshes with a pinion 80 on a shaft 81 which at its lower end is supported in a bearing 82 in the base portion 12 of the support, and at its upper end in a bearing 83 in the shelf portion 14 of the support. Mounted upon a rod 84 extending through the shaft is a centrifugal member 85 which is adapted to change its angular relation to the shaft according to the speed of the latter. Above and below the portion of the shaft to which the centrifugal member is attached are collars 86 and 87, both being adapted to slide on the shaft and connected to diametrically opposite points of the centrifugal member 85 by means of links 88 and 89, respectively. A spring 90 surrounding the upper portion of the shaft 81 presses at its lower end against the upper collar 86, and at its upper end against a nut 91 screw-threaded upon the upper end of the shaft 81 so that it may be adjusted to alter the tension of the spring. The other collar 87 bears against a sleeve 92 slidably mounted upon the shaft 81, and prevented from turning thereon by a guiding member 93, which, as shown most clearly in Fig. 6, is provided with extremities fitting within slots in the side of the sleeve. In order to reduce the friction between the top of the sleeve and the collar 87 a ball bearing 94 is used.

The sleeve 92 is formed with a rack, as at 95, which engages a segmental gear 96 on a shaft 97 passing through a bearing formed at the lower end of a plate 98 which is attached to projections from the face of the support 11. Attached to the outer end of the shaft 97 is a second segmental gear 99 which engages a pinion 100 on a shaft 101 mounted in bearings in the plate 98. An index or pointer 102 is attached to the front end of shaft 101 which extends through a cut-away part of the casing. A suitable index dial 103 is mounted on the front of the casing behind the index, and a transparent cover plate 104 protects the index and dial. A coiled spring 105 has one end attached to the shaft 101 and the other end adjustably attached to a projection 106 extending from the front face of the plate 98. This spring is coiled with relation to the shaft 101 so that acting through the shaft and gears 99 and 96 it tends to hold the sleeve 92 against the lower collar 94. At the rear end of the shaft 101 is a second pinion 107 which engages a rack 108 attached to the end of a rod 109 passing through a bearing in the shelf portion 14 of the support, and then through the top of the casing where at its upper end it is provided with a marker 110 similar to the marker upon the end of the rod 43, except that its arms are curved as shown most clearly in Fig. 5 so as to permit it to clear the other marker mounted upon the end of the rod 43. Both markers press against the tape upon the rollers 60 which thus provide a firm surface upon which the curves may be traced. For the purpose of oiling the various bearings and gears of the instrument, an oil feed tube 111 is mounted at its upper end in the shelf portion 14 and an aperture may be provided at the top of the casing through which oil may be supplied to the tube. From the lower end of the tube 11 a number of small tubes 112 pass to the vicinity of the bearings or gears which should be lubricated.

In the operation of the instrument described above, the main shaft 30 is driven from the wheel of the vehicle through the shaft 23, shaft 26 and gears 27 and 29, according to the speed of the vehicle. Through the shaft 36 and gears thereon, the cam 42 is rotated to reciprocate the rod 43 and actuate the counter 51 to register the total distance of travel of the vehicle. Also, as the rod 43 is reciprocated, the marker attached to its upper end will draw a wavy curve on the tape as shown in Fig. 1. The shape of the curve so drawn, and the distance between successive undulations of the curve form a permanent record from which the speed of travel of the vehicle may be determined from a knowledge of the factors involved and the rate of travel of the tape, which is driven from the clock mechanism at a uniform speed by means of the knurled disk 64.

At the same time that a curve is being traced upon the paper by the marker associated with the rod 43, a second curve will be produced by the marker associated with rod 109, since the latter is actuated through the rack and pinion and gear connections from the centrifugal member 85. At the same time the index or pointer 102 will be caused to move over the scale on dial 103 a distance proportional to the angular movement of the centrifugal member, so that the position of the index with reference to its scale shows directly at any time the speed of travel of the vehicle. There is also a simultaneous and proportional movement of the rod 109 carrying the second marker 110 so that a second curve is drawn upon the tape 57, which curve corresponds exactly with the positions assumed by the index 102 with reference to its scale. This curve is therefore a record of the speed of the vehicle which may be directly read. It is also a permanent record of what was seen or should have been seen by observation of the index 102, and since both the index and the rod and markers are actuated by movement of the shaft 101, there is little or no possibility of discrepancy between the indications of the index and the curve traced by the marker, such as might occur if the marker were actuated from some other part of the centrifugal apparatus, as has usually been done in prior constructions of this character. Furthermore, the provision of the coiled spring 105 insures that the sleeve 92 shall always be held against the lower face of the collar 87 which is directly connected to the centrifugal member 85, and this spring also takes up any back-lash that may occur when the direction of movement of the gear connections is reversed. By suitable adjustment of the spring 90, which is the main restoring spring for the centrifugal member 85, the latter may be accurately calibrated for the proper relation between its angular displacement and the speed of the vehicle. A further advantage of the present construction resides in the simple driving connection between the shaft 23 driven from a wheel of the vehicle, and the main shaft 30, the arrangement being such that there is no tendency for any of the rotary members forming this driving connection to be displaced from their true position which might result in an irregular drive of the apparatus. The entire instrument can be readily taken apart for inspection and repair, but when in service is effectively sealed against tampering.

It will be understood that various changes may be made in the details of construction of the apparatus without departing from the principle of the improvements of the present invention.

I claim:

1. The combination of a shaft adapted to be driven at variable speed, a centrifugal member connected to said shaft, a collar on the shaft connected to said centrifugal member and adapted to be moved along the shaft in accordance with the displacement of the centrifugal member, a sleeve slidably mounted on the shaft and prevented from rotating thereon, a rack on the sleeve, a gear engaging the rack on the sleeve, a second gear associated with the first gear, a second shaft, a pinion on the second shaft engaging the second gear, an index on the end of the second shaft, and a spring connected to said second shaft and adapted through said pinion and gears to hold said sleeve in contact with said collar so that displacements of the centrifugal member will be communicated to the index through said rack, gears and pinion.

2. The combination of a shaft adapted to be driven at variable speed, a centrifugal member connected to said shaft, a collar on the shaft connected to said centrifugal member and adapted to be moved along the shaft in accordance with the displacement of the centrifugal member, a sleeve slidably mounted on the shaft and prevented from rotating thereon, a rack on the sleeve, a gear engaging the rack, a second gear associated with the first gear, a second shaft, a pinion on the second shaft engaging the second gear, an index on the end of the second shaft, a second pinion on the second shaft, a rack engaging the second pinion, a marker associated with the rack, a travelling tape supported in coaction with the marker, and a spring connected to said second shaft and adapted through said pinion and gears to hold said sleeve in contact with said collar so that displacements of the centrifugal member will be communicated to the index and marker through said racks, gears and pinions.

3. The combination of a shaft adapted to be driven at variable speed, a centrifugal member connected to said shaft and driven thereby, a sleeve on the shaft actuated by said centrifugal member, a rack on the sleeve, a gear engaging the rack, a second gear movable with the first gear, a pinion engaging the second gear, an index associated with the pinion, a restoring spring having one end fixed and the other end connected to said shaft, a second pinion movable with the first pinion, a rack bar movable with the first pinion, a rack bar engaging the second pinion, a rod connected to the rack bar, a marker on said rod, a travelling tape supported in coaction with the marker, and means for driving the tape.

4. The combination of a shaft adapted to be driven at variable speed, a gear on said shaft, a second shaft, a gear on said second shaft engaging said first gear, a centrifugal member mounted on the second shaft, a sleeve slidably mounted on the second shaft, a collar upon the second shaft, a connection between the centrifugal member and the collar, a ball bearing between the sleeve and the collar, a second collar upon said second shaft, a connection between said centrifugal member and said second collar, a spring surrounding said second shaft and having one end in contact with said second collar, an abutment for the other end of the spring adjustably mounted on said second shaft, a rack bar associated with the sleeve, gears connected to the rack bar, an index and a marker adapted to be operated by the gears and a travelling tape supported in coaction with the marker.

5. The combination of a shaft adapted to be driven at variable speed, a worm on the shaft, a second shaft, a gear on said second shaft engaging said worm, a worm on said second shaft, a gear engaging said worm, a stub shaft upon which said gear is mounted, a cam associated with said gear, a rod adapted to be reciprocated by the cam and having a forked end fitting over said stub shaft, a spring connected to the rod to hold it against the edge of the cam, a marker on the end of the rod and a travelling tape supported in coaction with the marker.

6. The combination of a casing, a housing attached to the bottom of the casing and provided with a depending portion, a shaft rotatably mounted in the depending portion, a tubular member, a collar for attaching the said tubular member to the depending portion of the housing, a flexible driving connection in the tubular member connected to the lower end of the shaft and adapted to be driven at variable speed, a gear on the upper end of said shaft, a ball bearing within the housing and surrounding the shaft and upon which the gear, shaft and driving connection are carried, a second shaft, a gear on said second shaft meshing with the gear on the first-named shaft, a centrifugal device driven from said second shaft, an index and marker actuated by the centrifugal device and a travelling tape supported in coaction with the marker.

7. In a speed indicating instrument, a shaft, a centrifugal member pivoted thereon, two slidable sleeves on the shaft on opposite sides of the member, connections from points on the member distant from its pivot to the two sleeves, a spring disposed axially of said shaft outside the centrifugal member and bearing on one of the sleeves, a shaft connected to the other sleeve to be rotated by the axial movement thereof, and an index on the last named shaft.

8. In a speed indicating and recording instrument, a shaft, a centrifugal member pivoted thereon, two slidable sleeves on the shaft on opposite sides of the member, connections from points on the member distant from its pivot to the two sleeves, a spring disposed axially of said shaft outside the centrifugal member and bearing on one of the sleeves, a shaft connected to the other sleeve to be rotated by the axial movement thereof, an index on the last named shaft, a marker actuated by the last named shaft, and a travelling tape supported in coaction with the marker.

In testimony whereof I affix my signature.

ANTHONY F. WALLBILLICH.